United States Patent [19]

Bondoc

[11] 4,183,782
[45] Jan. 15, 1980

[54] METHOD OF PRODUCING GLASS MATS USING NOVEL GLASS FIBER DISPERSION COMPOSITION

[75] Inventor: A. A. Bondoc, Middlesex, N.J.

[73] Assignee: GAF Corporation, New York, N.Y.

[21] Appl. No.: 923,553

[22] Filed: Jul. 11, 1978

[51] Int. Cl.$^2$ ............................................. D21H 5/18
[52] U.S. Cl. .................................. 162/156; 162/158; 162/178
[58] Field of Search ............... 162/158, 156, 152, 145, 162/178, 183; 252/310; 536/114

[56] References Cited

U.S. PATENT DOCUMENTS

| | | | |
|---|---|---|---|
| 2,599,620 | 6/1952 | Filbert | 536/114 |
| 2,906,660 | 9/1959 | Hungerford et al. | 162/156 |
| 3,723,409 | 3/1973 | Yueh | 536/114 |
| 4,031,307 | 6/1977 | De Martino et al | 536/114 |
| 4,049,491 | 9/1977 | Brandon et al. | 162/157 C |
| 4,052,257 | 10/1977 | Hill et al. | 162/156 |

FOREIGN PATENT DOCUMENTS

| | | | |
|---|---|---|---|
| 838373 | 2/1976 | Belgium | 162/152 |
| 787649 | 6/1968 | Canada | 162/157 R |

OTHER PUBLICATIONS

Whistler, *Industrial Gums*, (1973) p. 310.

*Primary Examiner*—S. Leon Bashore
*Assistant Examiner*—Peter Chin
*Attorney, Agent, or Firm*—Walter C. Kehm; Walter Katz

[57] ABSTRACT

This invention describes an aqueous, glass fiber dispersion composition for making uniform, high strength glass mats which comprises a plurality of glass fibers dispersed in an aqueous system comprising an effective amount of an amine oxide and a derivatized guar gum.

A wet-laid process for making such mats using said dispersion composition also is described.

9 Claims, No Drawings

METHOD OF PRODUCING GLASS MATS USING NOVEL GLASS FIBER DISPERSION COMPOSITION

BACKGROUND OF THE INVENTION

1. Field of the Invention

This invention relates to the production of glass mats, and, more particularly, it is concerned with a glass fiber dispersion composition for making uniform, high-strength glass mats by the wet-laid process.

2. Description of the Prior Art

High strength, uniform, thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper making machinery, as described, for example, in the book by O. A. Battista, *Synthetic Fibers in Papermaking* (Wiley) N.Y. 1964. A number of U.S. patents also provide a rather complete description of the wet-laid process, including U.S. Pat. Nos. 2,906,660, 3,012,929, 3,021,255, 3,050,427, 3,103,461, 3,108,891, 3,228,825, 3,634,054, 3,749,638, 3,760,458, 3,766,003, 3,838,995, 3,905,067 and 4,052,257.

The wet-laid process comprises first forming an aqueous suspension or dispersion of a plurality of short-length glass fibers under agitation in a mixing tank. The fibers generally are available commercially as strands or bundles of many parallel fibers which filamentize or separate in the aqueous medium. The dispersion composition then is fed through a moving screen on which the fibers enmesh themselves while water is being removed.

Unlike natural fibers, such as cellulose or asbestos, however, glass fibers do not disperse well in water, even when stirred vigorously. In fact, upon extended agitation, the fibers actually agglomerate as large clumps which are very difficult to redisperse. In an attempt to overcome this inherent problem with glass fibers, it has been the practice in the industry to provide suspending aids for the glass fibers, including surfactants, in order to keep the fibers separated from one another in a relatively dispersed state. Such suspending aids usually are materials which increase the viscosity of the medium so that the fibers can suspend themselves without entangling. Some suspending aids actually are surfactants which function by reducing the surface attraction between the fibers. Unfortunately, however, none of the available suspending aids are entirely satisfactory for large volume manufacture of useful, uniform high strength glass fiber mats.

In the copending application, Ser. No. 851,683 (FDN-1062) filed Nov. 15, 1977, and assigned to the same assignee as the present application, there is described the use of amine oxide surfactants for forming well-dispersed glass fiber compositions. However, it is the object of this invention to provide improved dispersion compositions, which includes amine oxides in synergistic combination with another dispersing aid, for manufacture of uniform, high-strength glass mats suitable for industrial application.

SUMMARY OF THE INVENTION

This invention provides a novel aqueous glass fiber dispersion composition for making uniform, high-strength glass mats by the wet-laid process in which a plurality of glass fibers are very well dispersed in an aqueous system comprising an effective amount of an amine oxide and derivatized guar gum.

In another aspect of the invention, there is provided a method of producing such glass mats using said dispersion composition.

DETAILED DESCRIPTION OF THE INVENTION

Description of the Preferred Embodiments

In accordance with the present invention, there is provided herein a dispersion composition which meets a number of criteria simultaneously for making high quality, uniform, high-strength glass mats at a rapid rate of production and in an economically acceptable process. These features and advantages are listed below.

1. The dispersion composition of the invention provides a well-dispersed fiber system over a broad range of fiber consistencies, extending to very high fiber consistencies, both at the dispersion and mat-forming stages of the wet-laid process. Thereupon glass mats of desired basis weight are formed at a resonable rate.

2. The dispersion composition herein can be used in conjunction with manny different mat-forming machines, including flat, cylindrical or inclined wire machines. Therefore conventional paper making equipment as well as machines designed specifically for glass mat manufacture may be utilized with the dispersion composition of the invention.

3. The composition herein provides effective dispersions of glass fibers using dry or wet chopped fibers, which are sized or unsized, and which have a broad range of fiber lengths and diameters.

4. Production of glass mats can be carried out without forming unwanted foams.

5. The dispersion composition can be agitated for extended periods of time without affecting the quality of the glass mats produced therefrom.

6. The dispersion composition which is removed during mat formation can be recycled without affecting the uniformity and high-strength properties of the glass mats.

These and other advantages and features of the invention will be made apparent from the following more particular description of the preferred embodiments thereof.

In general, the glass fiber dispersion composition is made by thoroughly mixing the derivatized quar gum (hereinafter defined) component in tap water to form a viscous mixture. Then the amine oxide constituent is added with stirring, and chopped glass fiber strands are admixed to form the desired fiber dispersion composition.

After preparation of the stock glass fiber dispersion composition in this manner, the dispersion is pumped to a head box of a mat-forming machine where the desired glass mat is formed as a wet mat on the belt of the machine. The wet mat then may be dried, if necessary, then treated with a suitable binder, and, finally, thoroughly dried.

The glass mats of the invention exhibit uniformity of enmeshed glass fibers, and excellent high-strength properties, as measured by their tensile and tear strengths.

The derivatized guar gum component of the dispersion composition of the invention is characterized by the presence of substituent groups attached to guar gum itself. Derivatized guars suitable for use herein are identified as such in the commercial products which are available from Stein, Hall and Co., Inc. Typical derivatized guars include JAQUAR CMHP, which is a carboxymethylhydroxypropylated guar gum; C-13, which is a quaternary ammonium quar gum; and JAQUAR HP-11, which is a hydroxypropylated quar gum.

The amine oxide surfactant component of the dispersion composition is a tertiary amine oxide having the formula:

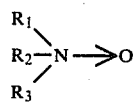

where $R_1$, $R_2$ and $R_3$ suitably are hydrocarbon groups containing between 1–30 carbon atoms. The hydrocarbon groups can be aliphatic or aromatic, and, if aliphatic, can be linear, branched or cyclic, and can be the same or different in each radical. The aliphatic hydrocarbon radical also can contain ethylenic unsaturation. Preferably, aliphatic groups are selected from among alkyl groups, such as lower alkyl or hydroxyalkyl groups having from 1–4 carbon atoms, and other substituted alkyl groups thereof, or long chain alkyl groups, having from 12–30 carbon atoms, such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$ and $R_3$ groups is about 14–40 carbon atoms, and, most preferably, about 18–24 carbon atoms.

Typical commercial amine oxides suitable for use herein include Aromox DMHT, which is dimethyl hydrogenated tallow amine oxide; Aromox DM16, which is dimethylhexadecylamine oxide; Aromox T/12, which is bis(2-hydroxyethyl) tallow amine oxide, available from Armak Co.; and Ammonyx SO, which is dimethylstearylamine oxide, available from Onyx Chemical Co.

A particularly useful amine oxide is Aromox DMHT, which has the formula:

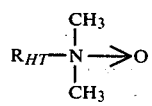

where $R_{HT}$ is $R_T$ hydrogenated to saturation, and $R_T$ is 3% tetradecyl, 27% hexadecyl, 16% octadecyl, 48% octadecenyl and 6% octadecadienyl.

The mechanism of the synergistic effect developed by the combination of derivatized guar with amine oxide in forming an excellent fiber dispersion system, and of providing high quality glass mats therefrom, is not clearly understood at present. However, it has been verified experimentally that the individual dispersing components do not perform nearly as well as the combination thereof. Furthermore, it is believed that the synergistic effect of this invention is not simply a change in the viscosity of the medium, since thickening amine oxides with the conventional thickening agents does not provide the same advantageous dispersing medium as with derivatized guars.

In order to further define the invention with particularity so that it may be carried out advantageously, the suitable, preferred and best mode parameters of the process of the invention are given below in Table I. The following definitions apply to this data:

"Dispersion consistency" is the percent by weight of the glass fibers in the stock aqueous dispersion medium. "Formation consistency" is defined as the consistency of the fibers at the head box of the mat-forming machine, which may be the same or lower consistency than the dispersion consistency. The dispersion composition may be diluted with water before entering the head box; this "diluted formation consistency" is given in Table I. The "amine oxide concentration" is given in ppm of this component. The "derivatized guar gum concentration" is indicated as percent by weight of the composition.

TABLE I

| | Fiber Dispersion Consistency (%) | Diluted Fiber Formation Consistency (%) | Conc. of Amine Oxide (ppm) | Conc. of Derivatized Guar Gum (% by wt.) | Glass Fiber Length (in.) | Glass Fiber Diameter (microns) |
|---|---|---|---|---|---|---|
| Suitable Range | 0.1–2% | 0.01–1% | 5–500 | 0.05–0.5 | 1/8–3 | 3–20 |
| Preferred Range | 0.2–1% | 0.02–0.5% | 10–200 | 0.1–0.3 | 1/4–2 | 5–18 |
| Best Mode Value | 0.5 | 0.03 | 20 | 0.2 | 1 | 16 |

Commercial glass fibers which form dispersions in the composition of the invention may be used herein, including, for example, glass fiber types E or C. Such fibers may be sized or unsized, and usable as dry or wet chopped form.

The fibers may be coated initially by spraying or otherwise applying the amine oxide surfactant thereon, and then dispersing the coated fibers in the aqueous derivatized guar gum medium. In this procedure, the coated fibers contain about 0.01 to 1% by weight of the amine oxide, and, preferably about 0.025 to 0.25%.

The glass mats produced in the process are uniform mats which have high tensile and tear strengths. For increased tensile strengths, generally, fibers of relatively lower diameters are used, while higher tear strengths are enhanced by using longer length and smaller diameter fibers.

The examples which follow will illustrate the invention, but are not to be considered as being limiting of the principles or practice thereof.

EXAMPLE 1

In this example, laboratory dispersion compositions were prepared using various derivatized guar gums at different usage levels in combination with 20 ppm of Aromox DMHT amine oxide. The dispersions were made with glass fiber type E, sized, dry chopped, 6 mm length and of 16 micron diameter, at a dispersion and formation consistency of 0.3% by weight. The dispersion composition was made by thoroughly mixing the derivatized guar gum in plain tap water until viscous, then admixing the amine oxide, and finally adding the fibers.

The glass mats were made in a Williams Handsheet Mold by dewatering the fiber dispersion through a stationary screen. The wet mats were further dewatered under vacuum and a urea-formaldehyde binder applied. The samples then were dried and cured by heating. The quality of the dispersions and the glass mat produced thereby were compared and the results are presented in Table II below.

TABLE II
QUALITY RATINGS OF DISPERSIONS AND GLASS MATS

| Exp. No. | Derivatized Guar | Usage Level of Derivatized Guar (% by wt.) | Quality of Dispersion | Quality of Glass Mat |
|---|---|---|---|---|
| 1 | CMHP | 0.2 | E | E |
| 2 | CMHP | 0.1 | E | E |
| 3 | CMHP | 0.05 | E | E-G |
| 4 | C-13 | 0.2 | E | E-G |
| 5 | C-13 | 0.1 | G | G-F |
| 6 | C-13 | 0.05 | G-F | G-F |
| 7 | HP-11 | 0.2 | E | G |
| 8 | HP-11 | 0.1 | G | F |
| 9 | HP-11 | 0.05 | F | F |

(WHERE E IS A QUALITY RATING OF EXCELLENT, G-GOOD AND F-FAIR)

When the same experiments were carried out without the derivatized guar gum component being present in the dispersion composition, or with Cytame 6, a polyacrylamide viscosity modifier, in its place, the results, on a comparative basis, were rated as poor, for both quality of the dispersion and of quality of the glass mat.

EXAMPLE 2

In this example, the mat former was a 0.5 m flat wire Fourdrinier Machine. The dispersion composition was prepared by mixing Aromox DMHT at 20 ppm and 0.2% CMHP in tap water with glass fibers, E-type, 13 mm in length, 13 micron diameter, sized, wet chopped fibers, to a 0.3% dispersion consistency. The strands of fibers were completely filamentized and uniformly distributed as an excellent dispersion in the aqueous medium. The stock dispersion was fed to the headbox of the mat-former without dilution to form a glass mat whose fibers were uniformly distributed throughout the mat. A urea-formaldehyde binder than was applied. The resultant glass mat had a 100 g/m² basis weight and excellent tensile and tear-strengths.

When the above example was repeated without the derivatized guar gum component, the quality of dispersion and glass mat was rated only as poor by comparison.

EXAMPLE 3

In this example, the mat-forming machine was a 0.5 m inclined wire Hydroformer. The dispersion composition consisted of Aromox DMHT, 20 ppm, CMHP, 0.2% E-type glass fibers, 25 mm length, 16 mm diameter, sized, and wet chopped. The dispersion consistency was 0.5%; the diluted formation consistency was lowered to 0.03, after dilution with additional dispersion composition removed during mat formation at the headbox. The dispersion quality was observed to be excellent. The glass mat with binder had an excellent tensile strength, N/50 mm width, MD/CMD of 500/282, at a basis weight of 110 g/m², even after many runs.

When the above example was repeated without CMHP, the dispersion and mat qualities were not as good as with the combination of components. The tensile strength of the mat, at the same basis weight, was reduced to 158/122.

EXAMPLE 4

In this example, the mat-forming machine was a 14 ft. wide, flat wire Fourdriner. The dispersion composition was Aromox DMHT, 20 ppm, CMHP, 0.2%, E-type fibers, sized, 13 mm length, 13 microns diameter, wet chopped fibers. The dispersion consistency was 0.3%. The dispersion was pumped to the headbox of the machine without dilution. The mat formed was of excellent quality, having a tensile strength, N/50 mm width, MD/CMD of 709/140, at a basis weight, with binder, of 95 g/m².

When the example was repeated without the CMHP, the mat had a much lower tensile strength of 292/110, and was inferior in uniformity.

What is claimed is:

1. A method of producing uniform, high-strength glass mats which comprises:
   a. dispersing a plurality of glass fibers bundles in an aqueous dispersion comprising an effective amount of an amine oxide surfactant and a derivatized guar gum which is at least about 5 ppm of said amine oxide and at least about 0.05 percent of said guar gum by weight of the aqueous dispersion containing said glass fibers to substantially filamentize said bundles and uniformly disperse the fibers;
   b. passing said dispersion through a mat-forming screen to form said glass mat while removing said aqueous system therefrom, and;
   c. recovering said glass mat.

2. A method according to claim 1 which includes the additional step of recycling the removed aqueous material through the mat forming screen.

3. A method according to claim 1 wherein said dispersion is diluted to a fiber consistency of about 0.01–1% by weight before being passed through said screen.

4. A method according to claim 1 wherein said fibers are dispersed to a fiber consistency of about 0.1–2% by weight, said amine oxide is present in said dispersion in an amount of about 5–500 ppm., and said derivatized guar gum is present in a concentration of about 0.05–0.5% by weight of said dispersion.

5. A method according to claim 1 in which said fiber consistency is about 0.2–1%, said amine oxide concentration is about 10–200 ppm., and said derivatized guar gum concentration is about 0.1–0.3.

6. A method according to claim 1 in which said fiber dispersion consistency is 0.5%, said amine oxide concentration is 20 ppm of dimethyl hydrogenation tallow amine oxide, and said derivatized guar gum concentration is 0.2% of carboxymethylhydroxypropylated guar gum.

7. A method according to claim 3 wherein said diluted fiber formation consistency is about 0.02–0.5%.

8. A method according to claim 3 wherein said consistency is 0.03%.

9. A method according to claim 1 wherein said fibers are dry or wet chopped fibers having a length of about ⅛–3 inches, a diameter of about 3–20 microns and are sized or unsized fibers.

* * * * *